(12) United States Patent
Hureau et al.

(10) Patent No.: US 11,175,723 B2
(45) Date of Patent: Nov. 16, 2021

(54) SYSTEM AND METHOD OF POWER MODE MANAGEMENT FOR A PROCESSOR

(71) Applicant: NXP USA, Inc., Austin, TX (US)

(72) Inventors: Loic Hureau, Toulouse (FR); Daniel McKenna, Glasgow (GB); Jean-Philippe Meunier, Ayguesvives (FR); Thomas Henry Luedeke, Oberbergkirchen (DE)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/852,936

(22) Filed: Apr. 20, 2020

(65) Prior Publication Data

US 2020/0371581 A1     Nov. 26, 2020

(30) Foreign Application Priority Data

May 20, 2019 (EP) ...................................... 19305638

(51) Int. Cl.
*G06F 1/3287* (2019.01)
*G06F 11/22* (2006.01)

(52) U.S. Cl.
CPC ........ *G06F 1/3287* (2013.01); *G06F 11/2284* (2013.01)

(58) Field of Classification Search
CPC .. G06F 1/3206; G06F 1/3287; G06F 11/0757; G06F 11/0796; G06F 11/2284
See application file for complete search history.

(56) References Cited

U.S. PATENT DOCUMENTS

| | | | | |
|---|---|---|---|---|
| 6,112,320 A | * | 8/2000 | Dien ................... | G06F 11/0757 714/51 |
| 2003/0204757 A1 | * | 10/2003 | Flynn ..................... | G06F 1/24 713/310 |
| 2004/0103345 A1 | * | 5/2004 | Dunstan ............... | G06F 1/3203 714/24 |
| 2005/0273635 A1 | * | 12/2005 | Wilcox ................. | G06F 1/3203 713/320 |
| 2010/0102865 A1 | | 4/2010 | Ramakrishnan et al. | |
| 2011/0022859 A1 | * | 1/2011 | More .................... | G06F 1/3203 713/300 |
| 2013/0086283 A1 | | 4/2013 | Miller et al. | |
| 2014/0039720 A1 | * | 2/2014 | Talbot ..................... | G06F 7/00 701/1 |

(Continued)

*Primary Examiner* — Jaweed A Abbaszadeh
*Assistant Examiner* — Brian J Corcoran (57) ABSTRACT

A system and method of power mode management for a processor providing safe and robust transitioning between normal and low power modes to meet low current requirements and to ensure accurate power mode transition communications. A two step process includes receiving a digital code, starting a standby entry timer, and receiving a low power request indication before timeout of the standby entry timer to ensure a valid request, and otherwise resetting upon timer timeout. A watchdog timer ensures that a maximum standby duration is not exceeded. An acknowledge timer ensures valid communication between modules of a power management IC. Memory elements ensure and maintain valid states of reset and safe state pins during standby. Self tests are performed in which test failure prevents transition to the low power mode. A power good indication ensures the processor that the supply voltages are suitable for both low power and normal operation.

13 Claims, 4 Drawing Sheets

(56) References Cited

U.S. PATENT DOCUMENTS

| | | |
|---|---|---|
| 2014/0149769 A1 | 5/2014 | Brock et al. |
| 2016/0014700 A1 | 1/2016 | Taha et al. |
| 2016/0360106 A1 | 12/2016 | Kurosaki et al. |

\* cited by examiner

SYSTEM AND METHOD OF POWER MODE MANAGEMENT FOR A PROCESSOR

BACKGROUND

Field of the Invention

The present invention relates in general to processor power mode management, and more particularly to a system and method of ensuring that power mode transitions take place in a robust and secure manner to reduce potential of failure.

Description of the Related Art

Safety is a concern for certain applications, such as automotive applications or industrial applications and the like. A processor or processing unit, such as a microprocessor, microcontroller, system on chip or any other processing configuration, may be used to process any type of data or information to control certain parameters, functions or operations associated with a particular application. Automotive applications may include, for example, gateways (e.g., in-vehicle networking and telematics), adaptive driver assistance systems (ADAS), infotainment (audio and/or video entertainment, information, navigation, hands-free control, etc.), clusters (digital instrumentation, heads-up display, etc.), vehicle to everything (V2X) (e.g., communication between a vehicle and external entities, traffic sign recognition, etc.), radar, vision (e.g., cameras, proximity sensors, collision avoidance, blind spot monitoring, etc.). Industrial applications may include, for example, industrial tablets or laptops and the like, internet protocol television (IPTV), industrial control, medical monitoring, home automation and/or alarm systems, etc.

A processor may have a low power mode, such as a standby mode or the like, to minimize power consumption during periods of inactivity in which all but a minimum amount of logic is powered down. An external Power Management IC (PMIC) may be used to provide supply voltage to the processor, and may further be used to control the power mode of the processor including transitioning between normal and low power modes. In such a configuration, any miscommunication between the processor and the PMIC could lead to power being removed at an incorrect time, causing the processor and any corresponding peripherals to be unexpectedly powered down. For applications in which safety is a concern including safety critical applications, the consequences of unexpected power down could be inconvenient or even dangerous in the event the system is unable to transition to a safe state.

SUMMARY

Aspects of the disclosure are defined in the accompanying claims.

In a first aspect, there is provided a processing system, comprising:
a power management circuit having a normal mode and a low power mode, comprising:
a power management processing module comprising:
a communication interface; and
a power control circuit that transitions said power management circuit from said low power mode to said normal mode when a low power exit request is received during said low power mode; and
a safety processing module, comprising:
a standby memory;
a standby entry timer; and
a safety control circuit that initiates said standby entry timer during said normal mode when a predetermined digital value is written into said standby memory, and that provides a standby start indication to transition said power management processing module to said low power mode only when a low power request indication is received before timeout of said standby entry timer.

In one or more embodiments said safety control circuit may perform a reset process when said standby entry timer times out before said standby request indication is received.

In one or more embodiments said power management processing module may further comprise: a power converter that provides a supply voltage; and said power control circuit may initiate power down of said power converter in response to said standby start indication from said safety control circuit and provide a standby response indication.

In one or more embodiments said power management processing module may further comprise: a watchdog timer; and said power control circuit may start said watchdog timer in response to said standby start indication from said safety control circuit, wherein said power processing circuit may perform a reset process when said watchdog timer times out, and wherein said power control circuit may assert a power good pin at a first state when said supply voltage is charged above a predetermined high threshold level and at a second state when said supply voltage is discharged below a predetermined low threshold level.

In one or more embodiments said power control circuit may stop said watchdog timer, reactivate said power converter and prompt said safety control circuit to wake up said safety processing module in response to receiving said low power exit request.

In one or more embodiments said safety processing circuit may start an acknowledge timer when said standby start indication is provided, wherein said safety processing circuit may perform a reset process when said acknowledge timer times out before said standby response indication is provided, and wherein said safety processing circuit may enter said low power mode and stop said acknowledge timer when said standby response indication is provided before timeout of said acknowledge timer.

In one or more embodiments said safety processing module may further comprise at least one memory element that maintains a state of each of at least one external pin during said low power mode.

In one or more embodiments said safety processing module may further comprise: a test circuit that may perform self test of said safety processing module during power up and that may provide a pass indication indicative thereof; and wherein said safety processing circuit may prevent entering said standby mode when said pass indication indicates test failure.

In one or more embodiments the processing system of claim 1 may further comprise: a processor having a normal processor mode and a low power processor mode, wherein said processor may comprise: a low power control circuit that requests entry into said low power processor mode by providing said predetermined digital value to said power management circuit via said communication interface; and a low power request circuit that provides said low power request indication after said predetermined digital value is provided.

In one or more embodiments said processor may further comprise a low power domain circuit that provides said low power exit request to request reentry to said normal processing mode, and that initiates reentry into said normal processing mode only when a power good pin of said power management circuit indicates that a supply voltage is above a predetermined threshold level.

In one or more embodiments said processor may further comprise a low power domain circuit that enables said processor to transition from said normal processing mode from said low power processing mode only when a power good pin of said power management circuit indicates that a supply voltage is below a predetermined threshold level.

In a second aspect, there is provided a method of power mode management, comprising: receiving a digital code during a normal mode of operation; comparing the received digital code with a predetermined digital value; initiating a standby entry timer when the received digital code matches the predetermined digital value; providing a standby start indication to begin transitioning into a low power mode of operation from the normal mode only when a standby request indication is received before timeout of the standby entry timer; and transitioning from the low power mode to the normal mode in response to receiving a low power exit request.

In one or more embodiments the method may further comprise performing a reset process when the standby entry timer times out before the low power request indication is received.

In one or more embodiments the method may further comprise: providing a supply voltage; and in response to receiving the standby start indication, discharging the supply voltage and providing a standby response indication.

In one or more embodiments the method may further comprise: starting a watchdog timer in response to receiving the standby start indication; performing a reset process when the watchdog timer times out; and asserting a power good pin at a first state when the supply voltage is charged above a predetermined high threshold level and at a second state when the supply voltage is discharged below a predetermined low threshold level.

In one or more embodiments the method may further comprise stopping the watchdog timer, reactivating the power converter and prompting wake up in response to receiving the low power exit request.

In one or more embodiments the method may further comprise: starting an acknowledge timer when the standby start indication is provided; performing a reset process when the acknowledge timer times out before the standby response indication is provided; and entering the low power mode and stopping the acknowledge timer when the standby response indication is provided before timeout of the acknowledge timer.

In one or more embodiments the method may further comprise providing at least one memory element that maintains a state of each of at least one external pin during the low power mode.

In one or more embodiments the method may further comprise: performing a self test during power up and that providing a pass indication indicative thereof; and preventing said entering the low power mode when the pass indication indicates test failure.

In one or more embodiments the method may further comprise: requesting, by a processor, entry into the low power mode by providing the digital code during the normal mode; providing, by the processor, the low power request after the digital code is provided; entering the low power mode, by the processor, when a power good indication indicates that a supply voltage is below a predetermined low threshold level; requesting, by the processor, entry into the normal mode by providing the low power exit request; and entering the normal mode, by the processor, when the power good indication indicates that the supply voltage is above a predetermined high threshold level.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

The inventors have recognized that it is advantageous to provide a robust and safe method to transition between a normal mode of operation and a low power mode of operation between a processor and a power management IC (PMIC) while also ensuring that communications across the interface are accurate. The normal mode means that the system is fully powered to perform the functions and operations for which the system was designed. The low power mode represents any reduced power mode (e.g., reduced power mode, sleep mode, standby mode, etc.) that reduces quiescent current in order to reduce overall power consumption. A system and method of power mode management as described herein provides dedicated interactions to ensure that transitions between the different modes of operation are safe and robust, such as ensuring that the processor does not unexpectedly transition to its low power mode when system critical functions are being performed.

Figure 1:
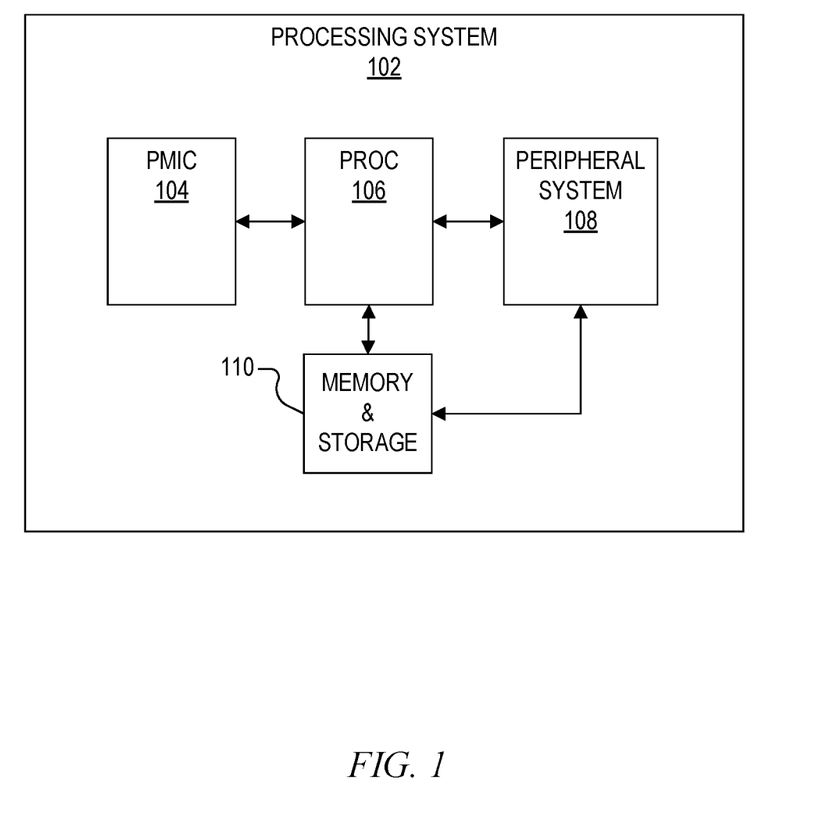
FIG. 1 is a simplified block diagram of a processing system implemented according to one embodiment of the present disclosure.

FIG. 1 is a simplified block diagram of a processing system 102 implemented according to one embodiment of the present disclosure. The processing system 102 may be implemented in a discrete manner or may be integrated onto a single module, such as a system on chip (SoC) or the like. The processing system 102 includes a power management IC (PMIC) 104, a processor 106, peripheral system 108, and a memory & storage module 110. The PMIC 104 cooperates with the processor 106 to ensure that power mode transitions of the processor 106 (and transitions of any other devices powered by the PMIC 104) take place in a robust and secure manner to reduce potential of failure as further described herein. The processor 106 may include any type of processing device or system, such as programmable integrated circuit, a microprocessor, a microcontroller or MCU, a central processing unit (CPU), an application processor, etc., and may include multiple processing devices. The memory & storage module 110 may include one or more of any type of memory or storage devices or any combination thereof, including, for example, random access memory (RAM), dynamic RAM (DRAM), synchronous DRAM (SDRAM), low power double data rate (DDR) (LPDDR4), non-volatile memory such as serial peripheral interface (SPI) Flash memory 190, NVRAM, Flash memory, solid state drive/s (SSDs), hard disk drive/s, optical drives, or any other suitable form of internal or external storage. The memory and storage devices may be incorporated on the processing system 102, or instead the memory & storage module 110 may be configured as interfaces to external memory or drives or the like.

The processing system 102 may be used to implement or may be part of an automotive application or an industrial application or the like in which safety and robustness are of concern. The peripheral system 108 may be used to interface sensors, communication devices, detectors, display devices, keyboards, controllers, mice, etc., to enable the processor 106 to process any type of data or information to control certain parameters, functions or operations associated with the particular application. In many such applications, the processor 106 includes a low power mode to reduce power consumption in which only a minimal amount of logic and circuitry remains powered sufficient to reawaken the processing system 102 to resume normal operations. The PMIC 104 controls the supply voltage provided to the PROC 106 (and any other peripherals) and further facilitates transitioning the processor 106 between its normal and low power modes as further described herein. The PMIC 104 also has a low power mode referred to herein as a "standby" mode in which it maintains a very low yet sufficient level of operation to detect a request by the processor 106 to reawaken the system.

Figure 2:
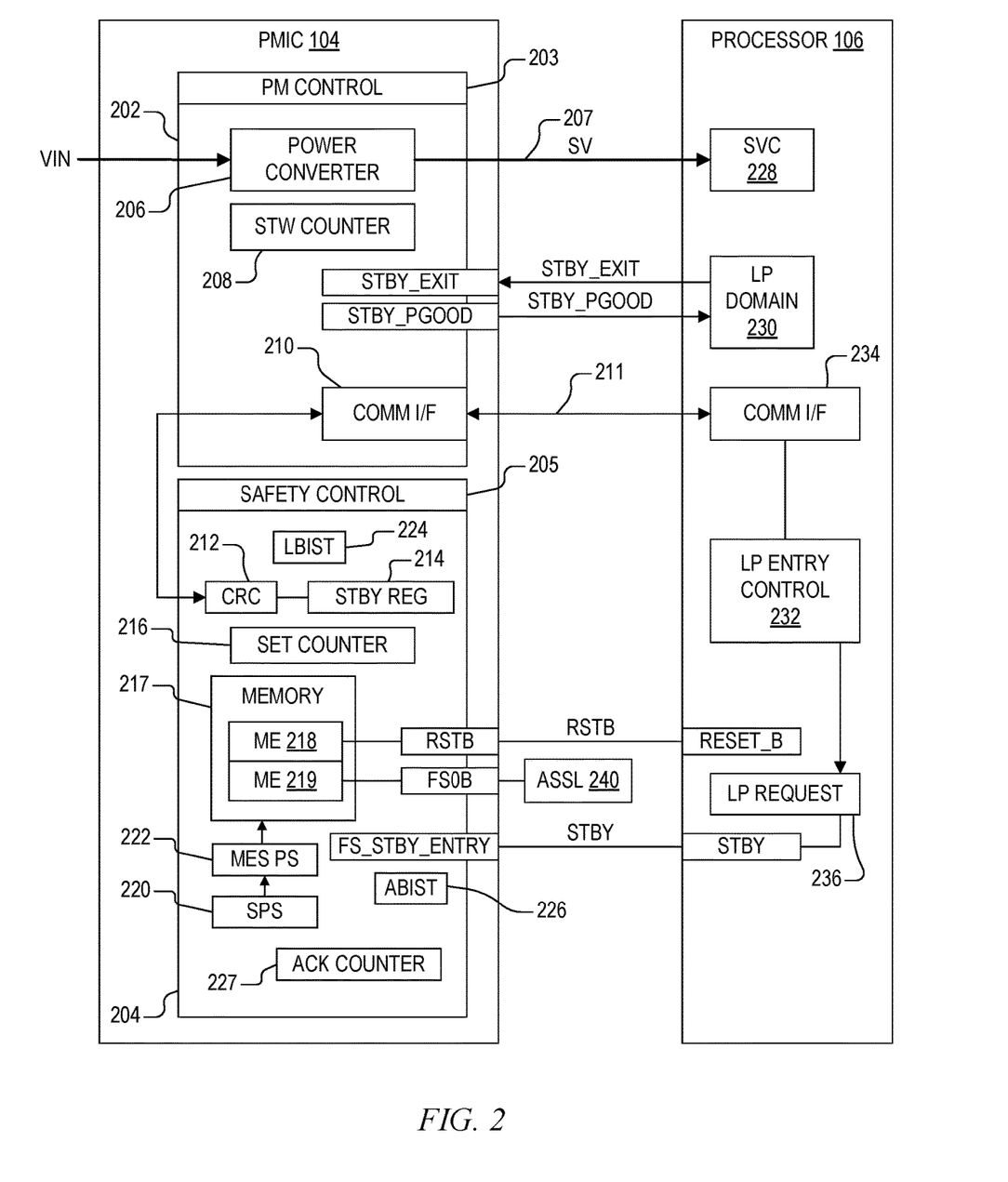
FIG. 2 is a more detailed block diagram of the PMIC interfacing the processor of FIG. 1 for controlling power mode transitions according to one embodiment of the present disclosure.

FIG. 2 is a more detailed block diagram of the PMIC 104 interfacing the processor 106 for controlling power mode transitions according to one embodiment of the present disclosure. The PMIC 104 is divided into two different modules for two different domains, including a power management processing module 202 and a safety processing module 204. The power management processing module 202 includes a power management (PM) control circuit 203 that generally controls operation of the power management processing module 202. The power management processing module 202 includes a power converter 206 including at least one switchable regulator that converts an input voltage VIN into at least one supply voltage (SV) provided on at least one voltage rail 207 sufficient to operate the processor 106. The input voltage VIN may be provided by any type of power source depending upon the particular application. For automotive and truck applications, for example, VIN may be provided by 12 Volt (V), 24V, or 48V battery or the like. Industrial applications may be powered by a battery or by a converter or inverter or the like providing VIN converted from an alternating current (AC) source voltage or the like. Depending upon the particular application and configuration of the processor 106 and other supplied devices, SV may be a single voltage or may include multiple voltages, such as, for example, 0.8V, 1.1V, 1.8V, 3.3V, 5V, etc. For purposes of discussion, SV is referred to herein as a single source voltage in which it is understood that SV may include multiple different voltage levels. The power converter 206 may include at least one non-switched regulator that remains on to power circuitry of the PMIC 104 during its standby mode.

The power management processing module 202 also includes a standby timing window (STW) counter 208 that is programmed with a standby timing value that defines a maximum amount of time for the processing system 102 to remain in the standby mode. The standby timing value is configurable for different configurations. The power management processing module 202 includes a communication interface (COMM I/F) 210 coupled to a communication bus 211 that enables communication with the processor 106. In one embodiment, the communication interface 210 and the communication bus 211 are configured as a serial communications interface, such as, for example, the inter-integrated circuit (I2C) serial communication interface configured according to the I2C protocol, although any suitable communication interface may be used, such as, for example, a serial peripheral interface (SPI) or the like.

The PMIC 104 further includes a standby exit (STBY_EXIT) pin and a standby power good (STBY_P-GOOD) pin which are both monitored and controlled by the PM control circuit 203 as further described herein. The STBY_EXIT pin is asserted high by the processor 106 to request exit from its low power mode by requesting that the PMIC 104 exit its standby mode. It is noted that as used throughout this disclosure, a pin or a signal is "asserted" high and "de-asserted" low or otherwise is asserted low and de-asserted high depending upon logical context. The state of the STBY_PGOOD pin indicates the voltage level of SV. The STBY_PGOOD pin may be asserted high to indicate to the processor 106 that SV is charged above a high voltage threshold level HVTH for entering the normal mode. The STBY_PGOOD pin may be asserted low to indicate to the processor 106 that SV is discharged below a configurable low voltage threshold level LVTH for entering its low power mode from the normal mode. The HVTH level is determined to indicate that the switchable regulator(s) is fully charged and SV is above a minimum level for fully powering the processor 106. The LVTH level is determined to verify that the switchable regulator(s) is sufficiently discharged to ensure that the powered-down portion of the processor 106 may be restarted with no residual internal biasing.

It is noted that if more than one SV is provided, then each individual source voltage may have a different low threshold voltage level and a different high threshold voltage level. In that case, STBY_PGOOD indicates that each source voltage is above a corresponding one of multiple high voltage threshold levels or is below a corresponding one of multiple low voltage threshold levels. It is noted that STBY_PGOOD may be a single pin with hysteresis function in which it starts low and transitions high only after SV>HVTH, and then transitions back low only after SV<LVTH. In one alternative embodiment, STBY_PGOOD may be implemented as two separate pins, such as PHI and PLO (not shown). For example, the state of PLO indicates whether or not SV is below LVTH whereas the state of PHI indicates whether or not SV is above HVTH. In other embodiments, separate power good signals or signal pairs may be provided for each SV. Operation is similar in each of these alternative embodiments in which multiple status signals may be considered in combination.

The safety processing module 204 includes a safety control circuit 205 that generally controls operation of the safety processing module 204. The safety processing module 204 includes cyclic redundancy check (CRC) logic 212 interfaced with the communication interface 210 to protect the integrity of end to end communication with the processor 106. The safety processing module 204 includes a standby (STBY) register 214 used for a first step in a two step standby process for transitioning to the standby mode as further described herein. The safety processing module 204 includes a standby entry timing (SET) counter 216 that is programmed with a standby entry timing value that defines a maximum time between the first and second steps of the two step standby process as further described herein. The safety processing module 204 includes a memory circuit 217 that includes a first memory element (ME) 218 coupled to a reset pin RSTB and a second memory element 219 coupled to a fail safe pin FS0B of the PMIC 104. The fail safe pin FS0B is coupled to external application safe state logic (ASSL) 240 to maintain the safe state of the application, which is not further described herein. The safety processing module 204 includes a safety processing supply (SPS) 220 and a memory elements safety processing supply (MES PS) 222, in which the memory elements safety processing supply 222 provides power to the memory elements 218 and 219 of the memory circuit 217.

The safety processing module 204 includes a standby entry pin (FS_STBY_ENTRY) pin that is coupled to a STBY pin of the processor 106. The processor 106 requests entry into its low power mode by asserting its STBY pin low as further described herein, which thus asserts the FS_STBY_ENTRY pin of the PMIC 104 low. The safety processing module 204 includes logical built-in self-test (LBIST) circuit 224 to check the integrity of the logic of the safety processing module 204 and also includes analog built-in self-test (ABIST) circuit 226 to check the integrity of the memory circuit 217 and the states of the FS0B and RSTB pins. The safety processing module 204 includes an acknowledgement (ACK) timing counter 227 to ensure that the processor 106 is not held up if the power management processing module 202 fails to transition to the standby mode.

STBY and STBY_EXIT are illustrated as two separate outputs of the processor 106, such as, for example, being provided by two separate pins of the processor 106. It is noted, however, that these two outputs may be combined into a single pin of the processor 106 having two different states including a first state indicating STBY and a second state indicating STBY_EXIT. In the event a single pin of the processor 106 is used, then a single STBY/STBY_EXIT pin of the processor 106 is coupled to both the STBY_EXIT pin and the FS_STBY_ENTRY pin of the PMIC 104, in which the STBY/STBY_EXIT pin is asserted low to request exit from the normal mode and entry into the low power mode, and is asserted high to request exit from the low power mode and entry into the normal mode. In yet another embodiment, the STBY_EXIT and FS_STBY_ENTRY pins of the PMIC 104 may be combined into a single pin in a similar manner.

The safety processing supply 220 may be powered down during the standby mode, but the memory elements safety processing supply 222 remains powered during standby to maintain power to the memory elements 218 and 219 of the memory circuit 217 during the standby mode. The memory element 218 keeps the RSTB pin held high during standby to prevent incidental reset of the processor 106. The memory element 219 keeps the FS0B pin held low during standby to keep the processing system 102 in the safe state until standby exit is requested by the processor 106 or upon timeout of the standby timing window counter 208 as further described herein.

The processor 106 includes a supply voltage circuit (SVC) 228 coupled to the supply voltage rail 207 for receiving SV (which includes one or more supply voltages) for providing power to the circuit of the processor 106. The processor 106 includes a low power (LP) domain 230 that remains powered during the low power mode of the processor 106. The low power domain 230 is coupled to the STBY_PGOOD pin of the PMIC 104 indicating the status of SV, and is also coupled to the STBY_EXIT of the PMIC 104 to request exit from the standby mode. The processor 106 includes a low power (LP) entry control circuit 232 coupled to a communication interface (COMM I/F) 234 which is further interfaced with the communication bus 211 for enabling communications with the PMIC 104. The communication interface 234 may also be configured according to the I2C protocol or the like. The LP entry control circuit 232 interfaces an LP request circuit 236 which controls the STBY pin of the processor 106. The processor 106 also includes a reset pin RESET_B coupled to the RSTB pin of the PMIC 104, in which the PMIC 104 may assert its RSTB pin low to reset the processor 106 under certain conditions as further described herein.

The LP entry control circuit 232 and the LP request circuit 236 initiate the two step standby process in cooperation with the PMIC 104 to transition from the normal mode to the standby mode. In one embodiment, when the processor 106 determines to enter its low power mode, the LP entry control circuit 232 sends a predetermined digital code to the PMIC 104 via the communication bus 211. The processor 106 then executes a power domain isolation sequence to internally ensure that its non-switchable power domain including the low power domain 230 has been cleanly isolated from the switchable power domain which is shut down during the standby mode. Upon successful completion of the power domain isolation sequence, the LP request circuit 236 asserts the STBY pin low to complete the request to enter the low power mode. Meanwhile, the PMIC 104 receives the predetermined digital code via the communication interface 210 and stores the digital code into the STBY register 214. Assuming CRC passes, the standby control circuit 205 performs validation in which it compares the received digital code with a predetermined digital value. If the digital code is validated in which it matches the predetermined digital value, then the standby control circuit 205 initiates the standby entry timing counter 216 and monitors the FS_STBY_ENTRY pin. If the FS_STBY_ENTRY pin is pulled low before timeout of the standby entry timing counter 216, then the low power request is considered valid and the standby control circuit 205 advances the standby mode as further described herein. If the standby entry timing counter 216 times out before the FS_STBY_ENTRY is asserted low, then the standby control circuit 205 determines an error condition and asserts the RSTB pin low to reset the processor 106.

Figure 3:
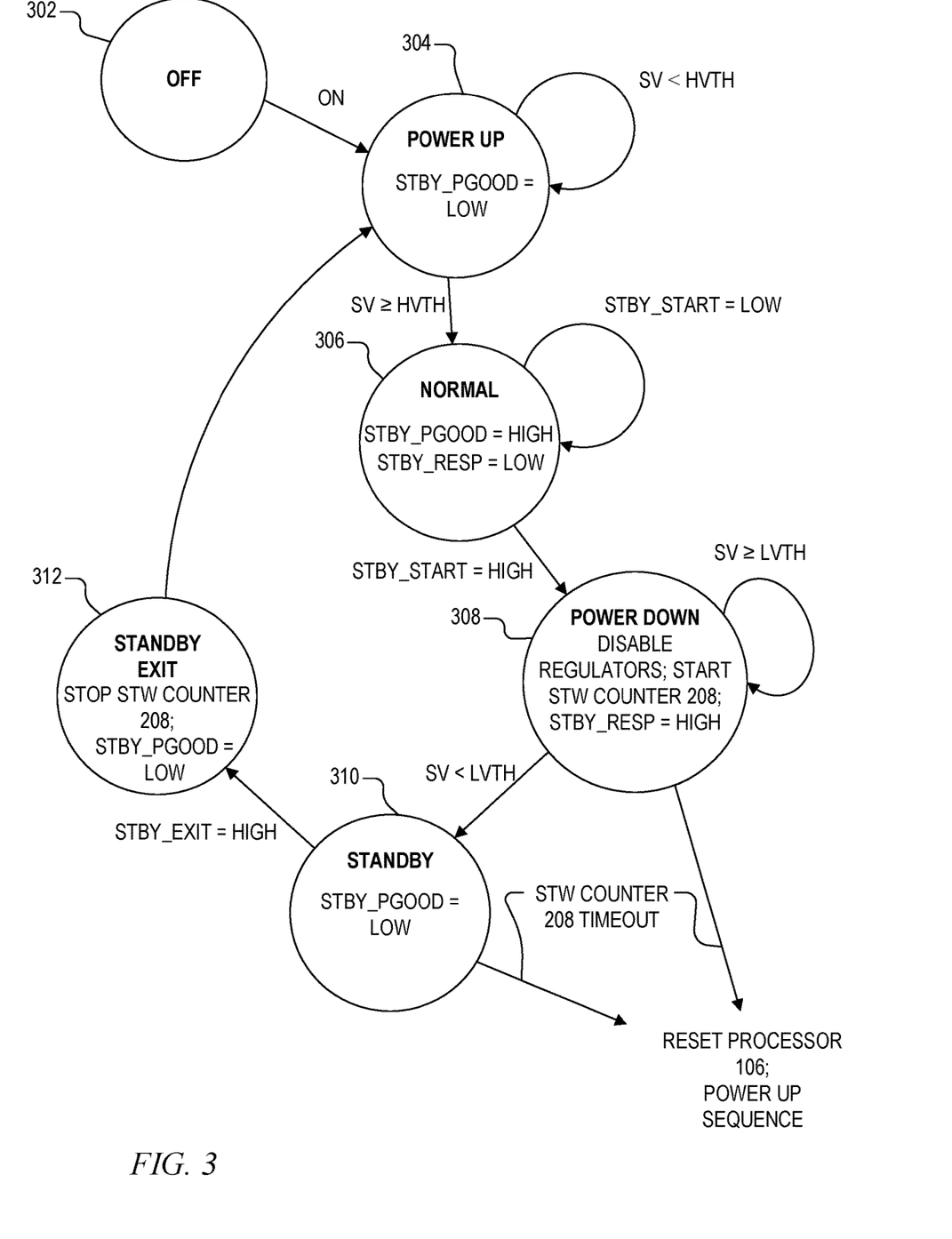
FIG. 3 is a state diagram illustrating operation of the power management processing module as controlled by the PM control circuit of FIG. 2 according to one embodiment of the present disclosure.

FIG. 3 is a state diagram illustrating operation of the power management processing module 202 of the PMIC 104 as controlled by the PM control circuit 203 according to one embodiment of the present disclosure. Generally, the power management processing module 202 converts VIN to SV which is provided to the processor 106, indicates the status of the of SV (e.g., via the STBY_PGOOD pin or the RSTB pin), communicates with the processor 106 via the communication bus 211 (e.g., receiving digital code as part of the two step standby entry process), ensures a maximum duration of the low power mode of the processor 106 (e.g., via the standby timing window counter 208), and detects a request from the processor 106 (e.g., STBY_EXIT) to exit its low power mode and return to the normal mode of operation.

A first OFF state 302 is a state in which the switchable regulators are off (or otherwise held in reset) and the system is in a "safe" state while holding the processor 106 in its off or reset state. Operation transitions to a POWER UP state 304 in response to an ON indication in which the PM control circuit 203 performs a predefined startup sequence including activating one or more switchable regulators in the power converter 206. During the startup sequence while SV is below the high threshold level HVTH, or SV<HVTH, STBY_PGOOD remains low. When the switchable regulators have stabilized and SV≥HVTH, operation transitions to a NORMAL state 306, and the PM control circuit 203 asserts STBY_PGOOD high and also asserts a signal STBY_RESP low. In response to RSTB and STBY_PGOOD both asserted high, the processor 106 proceeds to remove the isolation between the power domains and to execute the reset sequence for the switchable power domain(s). The power management processing module 202 remains in the NORMAL state 306 operating in normal mode while a signal STBY_START remains low.

When the safety processing module 204 asserts the STBY_START signal high indicating that the processor 106 has successfully requested transition to the low power mode, the PM control circuit 203 transitions to a POWER DOWN state 308 in which it starts the standby timing window counter 208 and begins disabling the switchable regulator(s) of the power converter 206 so that SV begins decreasing. Also, the PM control circuit 203 asserts the STBY_RESP signal high to indicate to the safety processing module 204 that the power management processing module 202 is transitioning to its standby mode. The POWER DOWN state 308 is not a complete power down of the PMIC 104 but instead is a state in which power is reduced from the full power normal mode to the low power standby mode. The STBY_START signal serves as a standby start indication from the safety control circuit 205 to the PM control circuit 203 for transitioning into the standby mode. The STBY_RESP signal serves as a standby response indication from the PM control circuit 203 to the safety control circuit 205 in response to the STBY_START signal. Operation remains in the POWER DOWN state 308 while SV≥LVTH. When the switchable regulator(s) of the power converter 206 are disabled so that SV<LVTH, then the PM control circuit 203 transitions to a STANDBY state 310 by placing the power management processing module 202 in its standby mode in which the STBY_PGOOD pin is asserted low. In the STANDBY state 310, the PMIC 104 and the processor 106 are both fully in their respective low power states expending the lowest possible quiescent current for low power operation.

Operation of the power management processing module 202 remains in its STANDBY state 310 until either the processor 106 asserts STBY_EXIT high to request transition back to the normal mode or upon timeout of the timer standby timing window counter 208. If the standby timing window counter 208 times out during either of the states 308 or 310 before STBY_EXIT is asserted high, then the PM control circuit 203 initiates a full reset and a new power up sequence to reset the entire system, including asserting RSTB low to reset the processor 106. The standby timing window counter 208 is programmed with a timing value determining the maximum amount of time to stay in the low power mode to prevent the processor 106 from getting stuck in its low power mode or somehow unable to awake. The processor 106 may perform periodic wakeup and power down sequences, such as during longer periods of inactivity or the like, to ensure that the system is ready to power up and perform normal operating functions. If for any reason the processor 106 fails to wakeup the system, timeout of the standby timing window counter 208 causes power cycling of the system.

When the STBY_EXIT pin of the PMIC 104 is asserted high before timeout of the standby timing window counter 208, then the PM control circuit 203 transitions to a STANDBY EXIT state 312 in which it stops the standby timing window counter 208 and begins the power up process. The STBY_PGOOD pin remains negated low during the STANDBY EXIT state 312. Operation then transitions back to the POWER UP state 304 in which the PM control circuit 203 performs the predefined startup sequence including activating the switchable regulator(s) of the power converter 206 as previously described. When SV≥HVTH as previously described, operation once again transitions to the NORMAL state 306 and asserts STBY_PGOOD high to wake up the processor 106.

Figure 4:
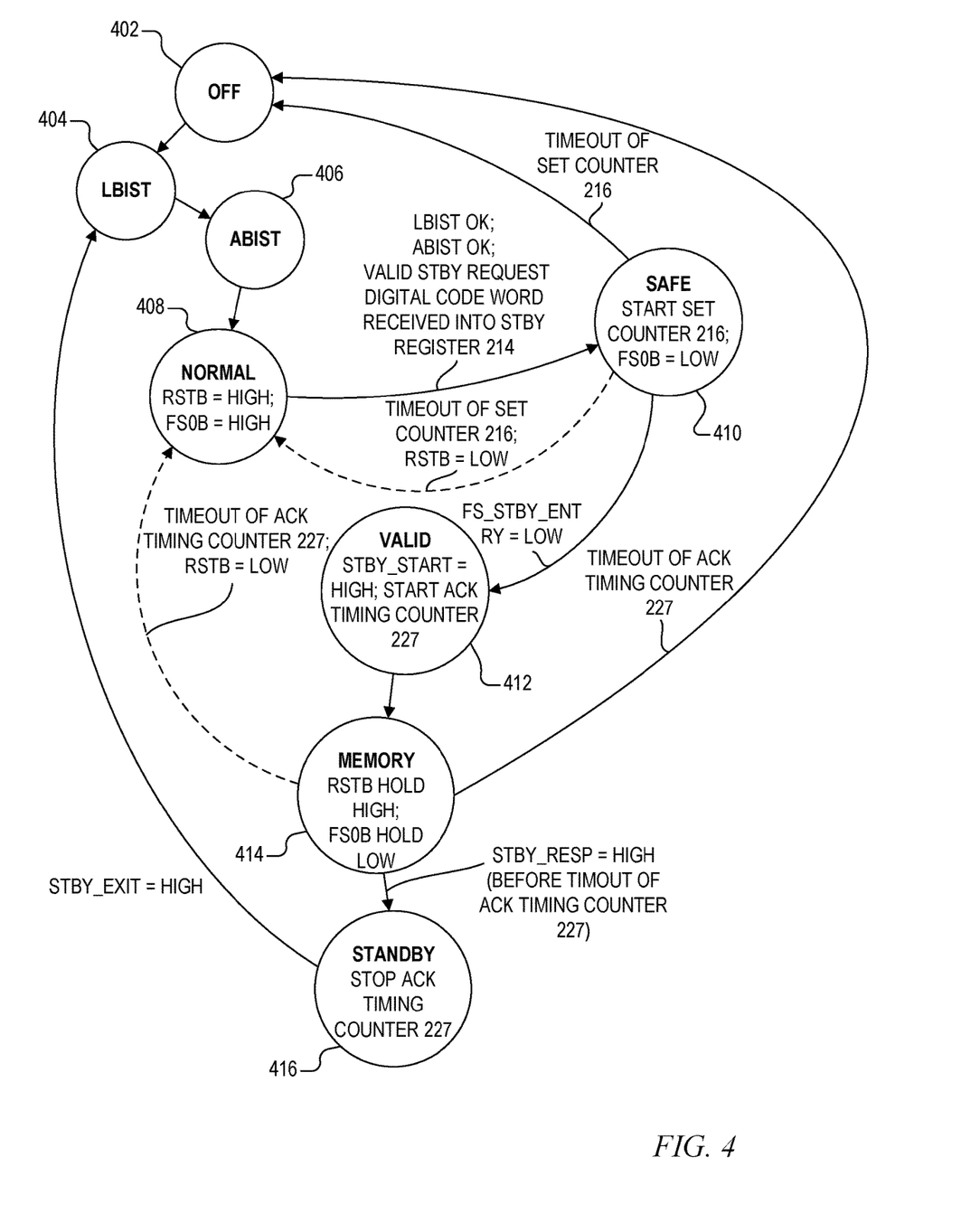
FIG. 4 is a state diagram illustrating operation of the safety processing module as controlled by the safety control circuit of FIG. 2 according to one embodiment of the present disclosure.

FIG. 4 is a state diagram illustrating operation of the safety processing module 204 of the PMIC 104 as controlled by the safety control circuit 205 according to one embodiment of the present disclosure. Generally, the safety processing module 204 performs integrity testing of the PMIC 104, controls the states of the FS0B and RSTB pins such as freezing the pin states during the standby mode, monitors the state of the FS_STBY_ENTRY pin, resets the processor 106 under certain conditions, monitors SV for overvoltage or under-voltage, times the duration between the two steps of the two step standby entry process to detect a valid standby transition request, times activation of the memory elements of the memory circuit 217, and performs CRC to protect the integrity of communications between the processor 106 and the PMIC 104 via the communication bus 211. It is noted that the safety processing module 204 and the power management processing module 202 operate independently yet in parallel with each other. The STBY_START and STBY_RESP signals are handshake signals for controlling transition from the normal mode to the standby mode as described herein.

A first OFF state 402 corresponds with the OFF state 302 of the power management processing module 202. When the power management processing module 202 transitions to the POWER UP state 304, the safety control circuit 205 transitions to an LBIST state 404 in which the LBIST circuit 224 is activated to check the integrity of the control logic of the safety processing module 204. Upon completion of the LBIST integrity test (LBIST OK or LBIST NOK), operation transitions to an ABIST state 406 in which the ABIST circuit 226 is activated to check the integrity of the memory circuit 217 and the states of the FS_STBY_ENTRY, FS0B, RSTB pins and analog monitors (not shown). Upon completion of the ABIST integrity test (ABIST OK or ABIST NOK), the safety control circuit 205 transitions to a NORMAL state 408 of the safety processing module 204 indicating that it is operating in its normal mode. The RSTB pin is de-asserted high to enable the processor 106 to power up, and the FS0B pin is also de-asserted high as long as LBIST OK and ABIST OK are both true. Operation remains in the NORMAL state 408 while the processor 106 is in its normal mode and performing its normal functions. If either LBIST NOK or ABIST NOK (either test failed), then entry into the standby mode is not allowed and operation remains in the NORMAL state 408 which prevents the processor 106 from entering its low power mode. It is noted that RSTB may be released to allow the PMIC 104 and the processor 106 to do some additional integrity testing to correct the condition or to indicate error.

The processor 106 begins the two step standby process by causing the LP entry control circuit 232 to send the digital code to the PMIC 104 via the communication bus 211. The PMIC 104 receives the predetermined digital code via the communication bus 211 and stores the digital code into the STBY register 214 of the safety processing module 204. If the safety control circuit 205 determines that the digital code is valid (meaning that it is equal to a predetermined digital code value), and if both LBIST and ABIST integrity tests have passed (LBIST OK and ABIST OK), then operation transitions to a SAFE state 410 in which the safety control circuit 205 starts the standby entry timing counter 216. It is noted that if either or both LBIST and ABIST indicated a failure, then the PMIC 104 prevents the processor 106 from entering the standby mode. The FS0B pin, which is coupled to the external application safe state logic 240, is asserted low to enter into the safe state of operation. Operation remains in the SAFE state 410 until timeout of the standby entry timing counter 216 or until the FS_STBY_ENTRY pin is asserted low completing the two step standby process. If timeout of the standby entry timing counter 216 occurs before the FS_STBY_ENTRY pin is asserted low indicating possible fault of the processor 106 such that the two step standby process is not completed, then in one embodiment the safety control circuit 205 returns operation back to the OFF state 402 and forces a full power down followed by power up of the entire system, which also causes power cycling of the power management processing module 202. Essentially, operation transitions back to OFF state 402 for the safety processing module 204 and back to OFF state 302 of the power management processing module 202 and then the system is powered back up. In an alternative embodiment as indicated by a dashed line, upon timeout of the standby entry timing counter 216, operation may instead return to the NORMAL state 408 with additional assertion of RSTB low to only reset the processor 106 without performing a full power down. Note that RSTB is asserted low during the transition and is then de-asserted back high in the NORMAL state 408 which causes the processor 106 to be reset.

If instead the FS_STBY_ENTRY pin is asserted low by the LP request circuit 236 of the processor 106 before timeout of the standby entry timing counter 216, then the safety control circuit 205 transitions to a VALID state 412 in which it asserts the STBY_START signal high causing the power management processing module 202 to transition to the POWER DOWN state 308. The safety control circuit 205 also initiates the ACK timing counter 227 in the VALID state 412, and then transitions to a MEMORY state 414 in which it activates the memory circuit 217 to hold the RSTB pin high in its released state and to hold the FS0B pin low to maintain the system in the safe state. Operation remains in the VALID state 414 until either timeout of the ACK timing counter 227 or until the STBY_RESP signal is asserted high indicating that the power management processing module 202 is successfully transitioning to the standby mode. The response to timeout of the ACK timing counter 227 may be similar to the response to timeout of the standby entry timing counter 216. In one embodiment, timeout of the ACK timing counter 227 causes the safety control circuit 205 to return operation back to the OFF state 402 and to force a full power down followed by power up of the entire system, which also causes power cycling of the power management processing module 202. Essentially, operation transitions back to the OFF state 402 for the safety processing module 204 and back to the OFF state 302 of the power management processing module 202 and then the system is powered back up. In an alternative embodiment as indicated by a dashed line, operation may return to the NORMAL state 408 with additional assertion of RSTB low to only reset the processor 106 without performing a full power down. As described before, the RSTB is asserted low during the transition and is then de-asserted back high in the NORMAL state 408 which causes the processor 106 to be reset.

If the STBY_RESP signal is asserted high before timeout of the ACK timing counter 227, operation transitions to a STANDBY state 416 in which the safety control circuit 205 transitions the safety processing module 204 to its standby mode and the ACK timing counter 227 is stopped. The safety processing module 204 is powered down in its standby mode except that the memory elements safety processing supply 222 remains minimally powered to power the memory circuit 217 to maintain the states of the RSTB and FS0B pins during the standby mode.

When the safety control circuit 205 detects assertion of the STBY_EXIT pin high (such as directly or via another signal in response to STBY_EXIT, not shown), it wakes up and transitions back to the LBIST state 404 to eventually transition to the NORMAL state 408 as previously described. Also, the safety processing module 204 is reset and powered up if the standby timing window counter 208 times out during the standby mode.

A system and method of power mode management for a processor providing safe and robust transitioning between normal and low power modes to meet low current requirements and to ensure accurate power mode transition communications. A two step process includes receiving a digital code, starting a standby entry timer, and receiving a low power request indication before timeout of the standby entry timer to ensure a valid request, and otherwise resetting upon timer timeout. A watchdog timer ensures that a maximum standby duration is not exceeded. An acknowledge timer ensures valid communication between modules of a power management IC. Memory elements ensure and maintain valid states of reset and safe state pins during standby. Self tests are performed in which test failure prevents transition to the low power mode. A power good indication ensures the processor that the supply voltages are suitable for both low power and normal operation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive logic or negative logic may be used in various embodiments in which the present invention is not limited to specific logic polarities, device types or voltage levels or the like. For example, logic states, such as logic low and logic high may be reversed depending upon whether the pin or signal is implemented in positive or negative logic or the like. In some cases, the logic state may be programmable in which the logic state may be reversed for a given logic function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A processing system, comprising:
a power management circuit having a normal mode and a low power mode, comprising:
a power management processing module comprising:
a communication interface; and
a power control circuit that transitions said power management circuit from said low power mode to said normal mode when a low power exit request is received during said low power mode; and
a safety processing module, comprising:
a standby memory;
a standby entry timer; and
a safety control circuit that initiates said standby entry timer during said normal mode when a predetermined digital value is written into said standby memory, and that provides a standby start indication to transition said power management processing module to said low power mode only when a low power request indication is received before timeout of said standby entry timer;
a processor having a normal processor mode and a low power processor mode, wherein said processor comprises:
a low power control circuit that requests entry into said low power processor mode by providing said predetermined digital value to said power management circuit via said communication interface; and
a low power request circuit that provides said low power request indication after said predetermined digital value is provided.

2. The processing system of claim 1, wherein said safety control circuit performs a reset process when said standby entry timer times out before said standby request indication is received.

3. The processing system of claim 1, wherein said power management processing module further comprises:
a power converter that provides a supply voltage; and
wherein said power control circuit initiates power down of said power converter in response to said standby start indication from said safety control circuit and provides a standby response indication.

4. The processing system of claim 3, wherein said power management processing module further comprises:
a watchdog timer; and
wherein said power control circuit starts said watchdog timer in response to said standby start indication from said safety control circuit, wherein said power processing circuit performs a reset process when said watchdog timer times out, and wherein said power control circuit asserts a power good pin at a first state when said supply voltage is charged above a predetermined high threshold level and at a second state when said supply voltage is discharged below a predetermined low threshold level.

5. The processing system of claim 4, wherein said power control circuit stops said watchdog timer, reactivates said power converter and prompts said safety control circuit to wake up said safety processing module in response to receiving said low power exit request.

6. The processing system of claim 3, wherein said safety processing circuit starts an acknowledge timer when said standby start indication is provided, wherein said safety processing circuit performs a reset process when said acknowledge timer times out before said standby response indication is provided, and wherein said safety processing circuit enters said low power mode and stops said acknowledge timer when said standby response indication is provided before timeout of said acknowledge timer.

7. The processing system of claim 6, wherein said safety processing module further comprises at least one memory element that maintains a state of each of at least one external pin during said low power mode.

8. The processing system of claim 6, wherein said safety processing module further comprises:
a test circuit that performs self test of said safety processing module during power up and that provides a pass indication indicative thereof; and
wherein said safety processing circuit prevents entering said standby mode when said pass indication indicates test failure.

9. The processing system of claim 1, wherein said processor further comprises a low power domain circuit that provides said low power exit request to request reentry to said normal processor mode, and that initiates reentry into said normal processing mode only when a power good pin of said power management circuit indicates that a supply voltage is above a predetermined threshold level.

10. The processing system of claim 1, wherein said processor further comprises a low power domain circuit that enables said processor to transition from said normal processing mode from said low power processing mode only when a power good pin of said power management circuit indicates that a supply voltage is below a predetermined threshold level.

11. A method of power mode management, comprising:
receiving a digital code during a normal mode of operation;
comparing the received digital code with a predetermined digital value;
initiating a standby entry timer when the received digital code matches the predetermined digital value;
providing a standby start indication to begin transitioning into a low power mode of operation from the normal mode only when a standby request indication is received before timeout of the standby entry timer; and
transitioning from the low power mode to the normal mode in response to receiving a low power exit request;
requesting, by a processor, entry into the low power mode by providing the digital code during the normal mode;
providing, by the processor, the low power request after the digital code is provided;
entering the low power mode, by the processor, when a power good indication indicates that a supply voltage is below a predetermined low threshold level;
requesting, by the processor, entry into the normal mode by providing the low power exit request; and
entering the normal mode, by the processor, when the power good indication indicates that the supply voltage is above a predetermined high threshold level.

12. The method of claim 11, further comprising performing a reset process when the standby entry timer times out before the low power request indication is received.

13. The method of claim 11, further comprising:
providing a supply voltage; and
in response to receiving the standby start indication, discharging the supply voltage and providing a standby response indication.

* * * * *